US008655467B2

(12) United States Patent
Xiong et al.

(10) Patent No.: US 8,655,467 B2

(45) Date of Patent: Feb. 18, 2014

(54) AUDIO TESTING SYSTEM AND METHOD

(75) Inventors: Yu-Kai Xiong, Shenzhen (CN); Xin Lu, Shenzhen (CN); Shih-Fang Wong, Tu-Cheng (TW); Dong-Sheng Lv, Shenzhen (CN); Zheng-Fei Wang, Shenzhen (CN); Xin-Hua Li, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 434 days.

(21) Appl. No.: 13/012,822

(22) Filed: Jan. 25, 2011

(65) Prior Publication Data

US 2012/0155660 A1 Jun. 21, 2012

(30) Foreign Application Priority Data

Dec. 16, 2010 (CN) .......................... 2010 1 0591571

(51) Int. Cl.
*G06F 17/00* (2006.01)

(52) U.S. Cl.
USPC .......................................................... 700/94

(58) Field of Classification Search
USPC ......... 381/56, 58; 340/500; 714/712; 700/94; 702/120, 108, 123
See application file for complete search history.

(56) References Cited

U.S. PATENT DOCUMENTS

2003/0115052 A1 * 6/2003 Chen et al. .................... 704/230

OTHER PUBLICATIONS

Audio Precision, ATS-2 Datasheet, Audio Precision, (Available for sale at least Jan. 2009).*
Audio Precision, ATS-2 user manual, Audio Precision, (Available for sale at least Jan. 2009).*

* cited by examiner

*Primary Examiner* — Andrew C Flanders
*Assistant Examiner* — David Siegel
(74) *Attorney, Agent, or Firm* — Altis Law Group, Inc.

(57) ABSTRACT

An audio testing system includes an acquisition unit, an input unit, a first analysis unit, a second analysis unit, and an output unit. The acquisition unit obtains an audio signal played back by the audio player. The input unit generates a first input signal and a second input signal. The first analysis unit analyzes the acquired audio signal with a first analysis method in response to the first input signal to obtain performance parameters of the audio player. The second analysis unit analyzes the acquired audio signal with a second analysis method in response to the second input signal to obtain another set of performance parameters of the audio player. The first analysis unit is more accurate than the second analysis unit, and efficiency of the second analysis unit exceeds that of the first analysis unit.

11 Claims, 2 Drawing Sheets

AUDIO TESTING SYSTEM AND METHOD

CROSS-REFERENCE TO RELATED APPLICATION

This application claims priority to Chinese Patent Application No. 201010591571.9, filed on Dec. 16, 2010, the contents of all of which are incorporated herein by reference in their entirety.

BACKGROUND

1. Technical Field

The present disclosure relates to device testing; and particularly to an audio testing system and method for testing performance of an audio player.

2. Description of Related Art

One method for testing the performance of an audio player includes obtaining an audio signal from the player, dividing the audio signal into a number of continuous data blocks, and analyzing each data block individually to obtain performance parameters. However, accuracy of the test result is critical during player development, but efficiency is more important during manufacture. Common testing methods have difficulty balancing the two priorities.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
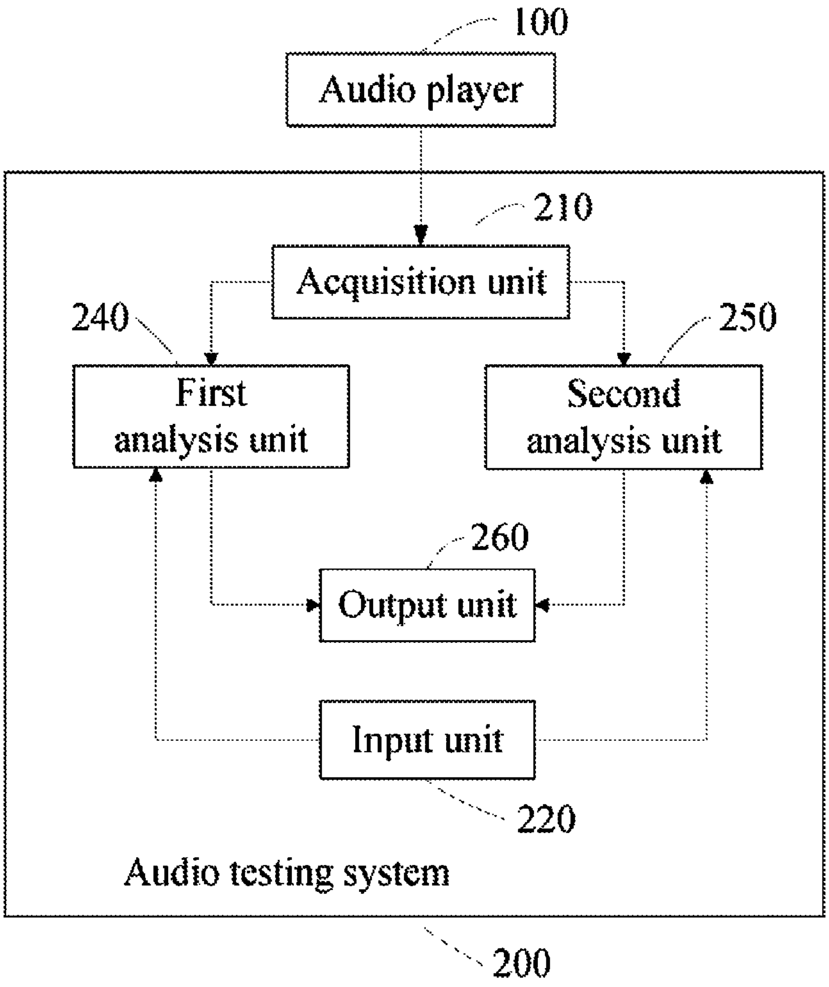
FIG. 1 is a block diagram of an audio testing system in accordance with an exemplary embodiment.

Referring to FIG. 1, an audio testing system 200 is used for testing performance of an audio player 100 playing back an audio file. The audio player 100 may be a media player (MP3), a cell phone, an optical disc player (DVD), or other devices.

The audio testing system 200 includes an acquisition unit 210, an input unit 220, a first analysis unit 240, a second analysis unit 250, and an output unit 260. The acquisition unit 210 acquires an audio signal played back by the audio player 100.

The input unit 220 generates a first input signal and a second input signal in response to inputs. In the embodiment, the input unit 220 includes a first control and a second control. The input unit 220 generates the first input signal when the first control is activated, and generates the second input signal when the second control is activated.

The first analysis unit 240 analyzes the acquired audio signal with a first analysis method in response to the first input signal to obtain performance parameters of the audio player 100. The second analysis unit 250 analyzes the acquired audio signal with a second analysis method in response to the second input signal to obtain another set of performance parameters of the audio player 100. Accuracy of the first analysis unit 240 exceeds that of the second analysis unit 250, while efficiency of the second analysis unit 250 exceeds that of the first analysis unit 240.

In the embodiment, the first analysis method includes dividing the acquired audio signal into a number of data blocks with adjacent data blocks partially overlapping, and analyzing each data block individually to obtain the performance parameters of the audio player 100. Since no boundary exists between adjacent data blocks, the acquired audio signal is completely analyzed, and analyzing results of the first analysis method is accurate. The second analysis method includes dividing the acquired audio signal into a number of data blocks with space between adjacent data blocks, analyzing parts of the data blocks and a middle data block between a current data block and a previous data block when the current data block is abnormal, to obtain the another set of performance parameters of the audio player 100. Accordingly, because the data blocks are divided by the second analysis unit 250 while the data blocks are overlapped by the first analysis unit 240, if the audio signals analyzed by the first analysis unit 240 and the second analysis unit 250 are the same, and size of each divided data block is the same, the number of data blocks divided by the second analysis unit 250 is less than the number of data blocks divided by the first analysis unit 240. Furthermore, the second analysis unit 250 selects the partial data blocks to analyze, while the first analysis unit 240 analyzes each data block individually, thus the number of data blocks analyzed by the second analysis unit 250 is less than the number of data blocks analyzed by the first analysis unit 240. Therefore, analyzing results of the first analysis unit 240 is more accurate than that of the second analysis unit 250, and the analyzing efficiency of the second analysis unit 250 exceeds that of the first analysis unit 240.

The output unit 260 provides performance parameters of the audio player 100 acquired by the first analysis unit 240 and the second analysis unit 250 via at least one medium of visual and/or audio output.

Figure 2:
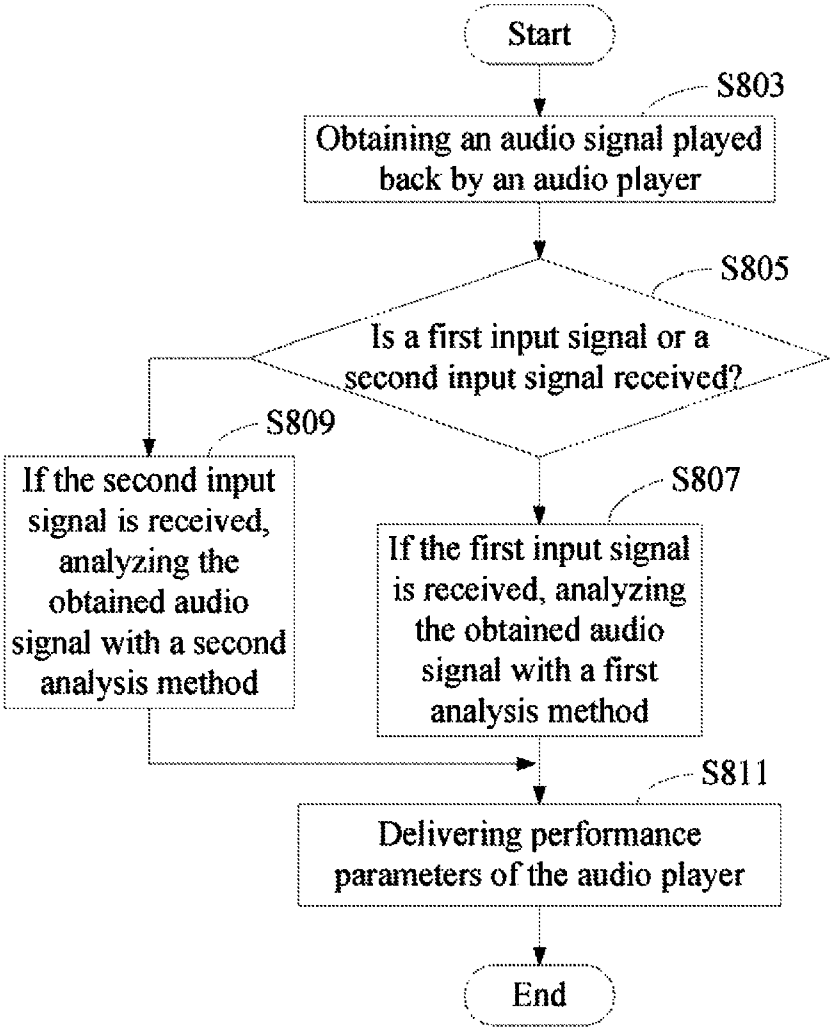
FIG. 2 is a flowchart of an audio testing method in accordance with an exemplary embodiment.

Referring to FIG. 2, an audio testing method is adapted to test performance of an audio player playing back an audio file. The audio player may be a media player (MP3), a cell phone, an optical disc player (DVD), or other devices.

In step S803, an audio signal played back by the audio player is obtained.

In step S805, it is determined whether a first input signal is received or a second input signal is received. If the first input signal is received, step S807 is implemented. If the second input signal is received, step S809 is implemented.

In step S807, the acquired audio signal is analyzed with a first analysis method to obtain performance parameters of the audio player.

In step S809, the acquired audio signal is analyzed with a second analysis method to obtain another set of performance parameters of the audio player.

In the embodiment, the first analysis method includes dividing the acquired audio signal into a number of data blocks wherein adjacent data blocks partially overlap, and analyzing each data block individually to obtain the performance parameters of the audio player. Since no boundary exists between adjacent data blocks, the acquired audio signal is completely analyzed, and analyzing results of the first analysis method is accurate.

The second analysis method includes dividing the acquired audio signal into a number of data blocks with clearance between adjacent data blocks, analyzing parts of the data blocks, and analyzing a data block between a current data block and a previous data block when the current data block being analyzed is abnormal. Accordingly, because the data blocks are separated in the second analysis method, and overlapped in the first analysis method, if the audio signals analyzed are the same, and size of each divided data block is the same, the number of data blocks divided by the second analysis method is less than the number of data blocks divided by the first analysis method. Furthermore, in the second analysis method, the partial data blocks are analyzed, and in the first analysis method, each data block is analyzed individually, the number of data blocks analyzed by the second analysis method is less than the number of data blocks analyzed by the first analysis method. Therefore, the first analysis method is more accurate than the second analysis method, and the second analysis method is more efficient than the first analysis method.

In step S811, the performance parameters of the audio player using the first analysis method and the second analysis method are provided via at least one medium of visual and/or audio output.

Using the audio testing system 200 and method, an analysis method can be chosen based on a current need for accuracy or alternatively, for efficiency.

It is to be understood, even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. An audio testing system adapted to test performance of an audio player for playing an audio file, the audio testing system comprising:

an acquisition unit adapted to obtain an audio signal played back by the audio player when the audio player is playing back the audio file;

an input unit adapted to generate a first input signal and a second input signal;

a first analysis unit adapted to analyze the obtained audio signal with a first analysis method in response to the first input signal to obtain performance parameters of the audio player;

a second analysis unit adapted to analyze the obtained audio signal with a second analysis method, the second analysis method: comprising dividing the obtained audio signal into a number of data blocks with space between adjacent data blocks; and analyzing parts of the data blocks to obtain another set of performance parameters of the audio player; and an output unit adapted to deliver the performance parameters of the audio player acquired by the first analysis unit and the second analysis unit;

wherein analyzing result of the first analysis unit is more accurate than that of the second analysis unit, and analyzing efficiency of the second analysis unit exceeds that of the first analysis unit.

2. The audio testing system according to claim 1, wherein the first analysis method comprises dividing the acquired audio signal into a number of data blocks with adjacent data blocks partially overlapping, and analyzing each data block individually to obtain the performance parameters of the audio player.

3. The audio testing system according to claim 1, wherein the second analysis method further comprises analyzing a middle data block between a current data block and a previous data block when the current data block being analyzed is abnormal.

4. The audio testing system according to claim 1, wherein the performance parameters of the audio player acquired by the first analysis unit and the second analysis unit are delivered via at least one medium of visual data and/or audible sounds.

5. A audio testing method for testing performance of an audio player, the method comprising:

obtaining an audio signal from the audio player during playback thereof;

determining whether a first input signal is received or a second input signal is received;

if it is determined that the first input signal is received, analyzing the obtained audio signal with a first analysis method to obtain performance parameters of the audio player;

if it is determined that the second input signal is received, analyzing the obtained audio signal with a second analysis method, the second analysis method comprising: dividing the acquired audio signal into a number of data blocks with space between adjacent data blocks; and analyzing parts of the data blocks to obtain another set of performance parameters of the audio player; and delivering the performance parameters of the audio player;

wherein analyzing results of the first analysis method is more accurate than that of the second analysis method, and analyzing efficiency of the second analysis method exceeds that of the first analysis method.

6. The audio testing method according to claim 5, wherein the first analysis method comprises dividing the acquired audio signal into a number of data blocks with adjacent data blocks partially overlapping, and analyzing each data block individually to obtain the performance parameters of the audio player.

7. The audio testing method according to claim 5, wherein the second analysis method further comprises analyzing a middle data block between a current data block and a previous data block when the current data block being analyzed is abnormal.

8. The audio testing method according to claim 5, wherein the performance parameters of the audio player are delivered via at least one medium of visual data and/or audible sounds.

9. An audio testing system, comprising:

a first analysis unit adapted to analyze an audio signal with a first analysis method to obtain performance parameters; and a second analysis unit adapted to analyze the audio signal with a second analysis method, the second analysis method comprising: dividing the acquired audio signal into a number of data blocks with space between adjacent data blocks; and analyzing parts of the data blocks to obtain another set of performance parameters;

wherein accuracy of the first analysis unit exceeds that of the second analysis unit, while efficiency of the second analysis unit exceeds that of the first analysis unit.

10. The audio testing system according to claim 9, wherein the first analysis method comprises dividing the acquired audio signal into a number of data blocks with adjacent data blocks partially overlapping, and analyzing each data block individually to obtain the performance parameters.

11. The audio testing system according to claim 9, wherein the second analysis method further comprises analyzing a middle data block between a current data block and a previous data block when the current data block being analyzed is abnormal.

* * * * *